(12) United States Patent
Dias et al.

(10) Patent No.: US 9,109,106 B2
(45) Date of Patent: Aug. 18, 2015

(54) IMPACT COPOLYMER COMPOSITIONS FOR USE IN CORRUGATED BOARD

(75) Inventors: Peter S. Dias, Missouri City, TX (US); Li-Min Tau, Lake Jackson, TX (US); John Kaarto, Missouri City, TX (US)

(73) Assignee: Braskem America, Inc., Philadelphia, PA (US)

( * ) Notice: Subject to any disclaimer, the term of this patent is extended or adjusted under 35 U.S.C. 154(b) by 771 days.

(21) Appl. No.: 13/115,619

(22) Filed: May 25, 2011

(65) Prior Publication Data

US 2012/0301682 A1 Nov. 29, 2012

(51) Int. Cl.
*B32B 3/28* (2006.01)
*C08L 23/00* (2006.01)
*C08L 23/04* (2006.01)
*C08F 8/00* (2006.01)
*C08F 214/26* (2006.01)
*C08L 27/12* (2006.01)
*C08L 23/12* (2006.01)

(52) U.S. Cl.
CPC .......... *C08L 23/12* (2013.01); *Y10T 428/24694* (2015.01)

(58) Field of Classification Search
CPC ........... B32B 3/28; C08L 23/10; C08L 23/12; C08L 23/16; C08L 27/12; C08L 2205/02; C08L 23/0815; C08L 27/18
USPC .......... 428/182, 181, 184, 186; 525/240, 191, 525/199, 200; 52/783.1, 783.11, 793.1, 52/783.18, 783.19
See application file for complete search history.

(56) References Cited

U.S. PATENT DOCUMENTS

| | | | |
|---|---|---|---|
| 5,972,475 A | 10/1999 | Beekman | |
| 6,059,514 A | 5/2000 | Sanchez | |
| 7,662,892 B2 * | 2/2010 | Jiang et al. | 526/65 |
| 2003/0000172 A1 | 1/2003 | Michael Hone | |
| 2004/0142135 A1 | 7/2004 | Verschuere et al. | |
| 2006/0010816 A1 | 1/2006 | Patrick | |
| 2007/0021566 A1 | 1/2007 | Tse et al. | |
| 2008/0045638 A1 | 2/2008 | Chapman et al. | |
| 2008/0251211 A1 | 10/2008 | Akiyama et al. | |
| 2011/0104447 A1 * | 5/2011 | Ydens et al. | 428/167 |
| 2011/0123745 A1 * | 5/2011 | Ek et al. | 428/36.9 |

FOREIGN PATENT DOCUMENTS

| | | |
|---|---|---|
| WO | WO 2005/040270 A1 | 5/2005 |
| WO | WO 2010/115878 A1 | 10/2010 |

OTHER PUBLICATIONS

International Search Report and Written Opinion, PCT/US12/39345, Aug. 17, 2012.

* cited by examiner

*Primary Examiner* — Catherine A Simone
(74) *Attorney, Agent, or Firm* — Duane Morris LLP

(57) ABSTRACT

The present invention relates to polymer compositions comprising a propylene impact copolymer and a processing aid, as well as corrugated boards made from such compositions. The impact copolymer has a melt flow range of from 1.5 to 3.5 g/10 min and a dispersed phase content of from 5 to 30% by weight. The dispersed phase of the impact copolymer has an ethylene content of from 30- to 70% by weight of the dispersed phase. The matrix phase of the impact copolymer is a propylene homopolymer or a random copolymer comprising units derived from propylene and a second copolymer selected from either ethylene or 1-butene wherein the units derived from the second copolymer comprise from 0 to 5% by weight of the dispersed phase.

6 Claims, No Drawings

IMPACT COPOLYMER COMPOSITIONS FOR USE IN CORRUGATED BOARD

FIELD OF THE INVENTION

The present invention relates to polymer compositions comprising a propylene impact copolymer and a processing aid. The polymer compositions are particularly well suited for use in corrugated boards, as by using such compositions, corrugated boards can be made at high production rates without pitting.

BACKGROUND AND SUMMARY OF THE INVENTION

Polymeric twin wall panels, also referred to as corrugated board, or twin wall board, hollow board, or fluted sheets, have been manufactured and used for many years. Such panels have broad application for packaging, signage, building and for other similar purposes. These products have found favor as alternatives to twin wall cardboard products or Masonite as they are more durable, are not susceptible to water damage and are generally stronger than cardboard products of similar weight. Notwithstanding the advantages of polymeric twin wall products in terms of physical performance there are limitations in using these boards as signs or as packaging due to difficulties in achieving high print quality on the polymeric surface. These problems are exacerbated when running at high line speeds.

When running at high speeds, it has been observed that the surface of the corrugated board becomes increasingly pitted, particularly along the flutes. Such pits cause imperfections in the printing, which may cause dark spots in the printing due to ink pooling in the pits or blank spots where the ink does not contact the surface of the sheet. These problems may make the corrugated boards unsuitable for printed applications. This pitting problem appears to be particularly prevalent when the corrugated board has particularly thin walls, for example having wall thicknesses of less than 0.3 mm. In such applications it is generally preferred to use resins having higher melt flow rates (for example resins having an MFR greater than 1 g/10 min). It would be desirable to have polymeric twin wall boards which can be produced at line speeds greater than 5 m/min which have smooth surfaces with little or no pitting.

In one aspect, the present invention is a composition comprising an impact copolymer and a processing aid which can be used to make such polymeric twin wall boards. The impact copolymer has a melt flow range of from 1.5 to 3.5 g/10 min and a dispersed phase content of from 5 to 30% by weight. The dispersed phase of the impact copolymer comprises a copolymer comprising units derived from ethylene and units derived from one or more alpha-olefins having from 3 to 12 carbon atoms. Preferably the dispersed phase comprises a propylene-ethylene copolymer (EPR). The dispersed phase has an ethylene content of from 30- to 70% by weight of the dispersed phase (that is, the dispersed phase comprises from 30 to 70 percent by weight of units derived from ethylene). The matrix phase of the impact copolymer is a propylene homopolymer or a random copolymer comprising units derived from propylene and a second copolymer selected from either ethylene or 1-butene wherein the units derived from the second copolymer comprise from 0 to 5% by weight of the dispersed phase.

In another aspect the present invention is a corrugated board having improved printability comprising the impact copolymer of the first aspect of the invention and a processing aid.

In another aspect the present invention is a method of making a corrugated board comprising the steps of first selecting a base resin comprising the impact copolymer of the first aspect of the invention, then adding a processing aid to the base resin in an amount of from 50 ppm to 2000 ppm, and then forming the corrugated board in an extrusion process.

DETAILED DESCRIPTION OF THE INVENTION

The following analytical methods and definitions are used in the present invention:

The term "polymer", as used herein, refers to a polymeric compound prepared by polymerizing monomers, whether of the same or a different type. The generic term polymer thus embraces the term "homopolymer", usually employed to refer to polymers prepared from only one type of monomer, as well as "copolymer" which refers to polymers prepared from two or more different monomers.

"Polypropylene" shall mean polymers comprising greater than 50% by weight of units which have been derived from propylene monomer. This includes polypropylene homopolymers or copolymers (meaning units derived from two or more comonomers).

"Melt flow rate" also referred to as "MFR" is determined according to ASTM D1238 (230° C., 2.16 kg).

"$E_m$" refers to the weight percent of comonomer (typically ethylene) in the matrix phase. $E_m$ can be determined during production using the mass-energy balance method as generally known in the art. $E_m$ can also be determined by isolating a sample of the matrix polymer and analyzing using Fourier transform infrared spectroscopy ("FTIR") as known the art. $E_m$ can also be estimated by analyzing the entire ICP using DSC melting point.

"$E_{tot}$" refers to total percent by weight comonomer (typically ethylene) in the propylene impact copolymer, and is measured by a well known method reported by S. Di Martino and M. Kelchtermans "Determination of the Composition of Ethylene-Propylene Rubbers Using 13C-NMR Spectroscopy" J. of Applied Polymer Science, v 56, 1781-1787 (1995).

"$F_c$" refers to the percent by weight of the dispersed phase in the total impact copolymer. In general $F_c$ is equal to the ratio of amount of dispersed phase to the total amount of material made, which can readily be determined by mass balance or FTIR. FTIR is the preferred method when the matrix phase contains no commoner. Alternatively, for such impact copolymers containing no comonomer in the matrix, the dispersed phase content in the impact copolymer generally can be assessed by determining the amount of material which remains soluble in xylene at room temperature. Xylene Solubles (XS) is measured according to ASTM D5492. The amount of xylene solubles measured by this method generally corresponds to the amount of dispersed rubber phase (Fc) in the impact copolymer. For impact copolymers containing comonomer in the matrix, the mass balance method is a more applicable method to determine Fc.

"$E_c$" refers to the ethylene content percent by weight in the dispersed phase and is calculated as $E_c=[E_{tot}-E_m(1-F_c)]F_c$.

Polymeric twin wall boards generally include a first substantially planar sheet forming the upper side of the board, a second substantially planar sheet forming the underside of the board and a plurality of spaced longitudinally extending webs connecting the first substantially planar sheet to the second substantially planar sheet.

Preferably, the twin wall board of the invention includes longitudinally extending webs (sometimes referred to as ribs or struts) which are separated by a distance of between 2.0 to 5.0 mm. The thickness of the ribs and the first and second planar sheets can vary depending on the strength requirements of the intended board. However, generally these walls of the board are of about equal thickness and between 0.1 to 0.3 mm.

The preferred material employed for use in the twin wall plastic sheet is a polypropylene impact copolymer together with a processing aid. Impact copolymers comprise a matrix phase and a dispersed phase. The impact copolymer for use in the present invention has a melt flow range of from 1.2 to 4.0 g/10 min as determined by ASTM 1238 (2.16 kg/230C), preferably from 1.5 to 3 g/10 min, even more preferably from 1.6 to 2.4 g/10 min. The impact copolymer will preferably have a dispersed phase content of from 5 to 30% by weight of the impact copolymer, more preferably 10 to 20%, even more preferably from 11 to 18% by weight of the impact copolymer. The dispersed phase comprises a copolymer comprising units derived from ethylene and units derived from one or more alpha-olefins having from 3 to 12 carbon atoms. Preferably the dispersed phase comprises a propylene-ethylene copolymer (EPR). The dispersed phase has an ethylene content of from 30- to 70% by weight of the dispersed phase (that is, the dispersed phase comprises from 30 to 70 percent (by weight of the dispersed phase) of units derived from ethylene), more preferably from 40 to 70%, and even more preferably from 45 to 65%.

The impact copolymer also comprises a matrix phase which is a homopolymer polypropylene or a propylene random copolymer having from 0 to 5% by weight of the matrix phase of units derived from ethylene or 1-butene, more preferably from 0 to 2%. More preferably the matrix phase is a propylene homopolymer and most preferably a polypropylene homopolymer having a low xylene solubles content (as determined by ASTM D5492) of less than 2.5 percent by weight, or even less than 2.0 percent, based on the weight of the matrix phase.

The compositions of the present invention also comprise a processing aid. Processing aids are generally known in the art, and are particularly used to reduce melt fracture. For corrugated sheets, however, melt fracture was not present at levels significant enough to cause problems with printing or aesthetics, and so in general processing aid is not used in this application. It has unexpectedly been observed, however, that processing aids reduce pitting in the present application.

The processing aids used in the present invention should not exude to the surface of the extrudate at levels which may plug the holes in the vacuum calibrator. Further, processing aids such as calcium stearate or other metallic stearates, are not appropriate for the present application due to possible formation of stearic or other fatty acids which may also block holes in the vacuum calibrator. Accordingly the preferred compositions of the present invention exclude levels of metallic stearates typically used with impact copolymers, for example more than 300 ppm.

Suitable processing aids for use in the present invention are fluoropolymers including fluoro elastomers and crystalline or semi-crystalline fluoroplastics or blends thereof. The fluoropolymer to be blended with the impact copolymer may be any polymer containing fluorine. The fluoropolymers as a class can be crystalline or generally amorphous. Exemplary of commercially available processing aids suitable for use in the present invention include materials available under the following designations: 3M's Dynamar FX 5911, Dynamar FX 5912, Dynamar FX 5920A, Dynamar FX 5926, Dynamar FX 5927, Dynamar FX 9613, Dynamar FX 9614; DuPont's Viton Freeflow Z100, Viton Freeflow Z110, Viton Freeflow Z200, Viton Freeflow Z210, Viton Freeflow Z300, Viton Freeflow 10, Viton Freeflow RC; Daikin's DAI-EL DA-410, DAI-EL DA-910 and Solvay's Tecnoflon NM and SOLEF 11010. A suitable class of fluoropolymer for use in the present invention is a polymer derived from one or more of the following materials: vinylidene fluoride, hexafluoropropylene and tetrafluoroethylene.

The processing aid is preferably present in an amount of from 50 to 2000 ppm by weight of the composition, alternatively from 100 to 1000, from 150 to 500, or even from 200 to 400 ppm. The processing aid can be added as a masterbatch or neat, in any stage of the production (for example, during pelletizing, compounding or at the corrugated board production line), as is generally known in the art.

A variety of additives may be incorporated into the impact copolymer for various purposes as is generally known in the art. Such additives include, for example, stabilizers, antioxidants (for example hindered phenols such as Irganox™ 1010 from the BASF Corporation), phosphites (for example Irgafos™ 168 from the BASF Corporation), fillers, colorants, clarifiers (for example, Millad 3988i and Millad NX8000 from Milliken & Co.), antiblock agents, fillers (including $TiO_2$, talc, $CaCO_3$), acid scavengers, waxes, antimicrobials, uv stabilizers, nucleating agents (for example NA-11 from Amfine Corporation), optical brighteners and antistat agents. It is preferred that the type and amounts of such additives be controlled in a manner such that the additive will not block the vacuum calibrator holes.

The process for the manufacture of a polymeric twin wall board includes extruding a molten polymeric material through a die configured to produce a board having opposed first and second substantially planar sheets separated by a plurality of transverse longitudinally extending webs. The extruded material is delivered into a cavity bounded by upper and lower platens, also known as a vacuum calibrator, where the extruded material is cooled to form a solidified board, wherein a sufficiently high vacuum is applied to at least one side of the extruded polymeric material whilst in the cavity. It is preferred that the vacuum be applied to both sides of the extruded polymeric material. Suitable equipment is commercially available, for example, from Union Officine Meccaniche.

It is preferred that the corrugated sheets of the present invention be formed in a process where the line speed is at least 5 m/min, more preferably at least 6 m/min. It is preferred that the process of the present invention be capable of operating at a line speed which is at least 20% faster than the maximum line speed obtainable with the same resin except for the presence of the processing aid. Despite such increased rates, it has been discovered that the use of the resin composition of the present invention allows corrugated sheets without pitting. For purposes of the present invention a "pit" is defined to mean an indentation of at least 10 microns on the surface of the sheet having a diameter (or in the case of an elliptical indentation, the major axis) of at least 50 microns. Pits visible to the naked eye are typically in excess of 200 microns in diameter at a depth of at least 10 microns. The size and depth of any indentation can be measured using optical light microscopy or scanning electron microscopy, as is generally known in the art. The corrugated boards of the present invention have less than 1 pit per square meter, preferably no pitting. The corrugated boards of the present invention especially have less than 1 pit having a diameter of at least 200 microns, per square meter, and preferably will have no pits of such size.

It has also been observed that the resin compositions of the present invention result in corrugated boards having improved smoothness as compared to prior corrugated boards.

EXAMPLES

To demonstrate the effectiveness of the present invention a series of corrugated boards are prepared from the following resin formulations:

Comparative Example 1 is an impact copolymer having an MFR of 1.7 g/10 min, and a dispersed phase comprising 13% by weight of the impact copolymer. The dispersed phase comprises a propylene-ethylene copolymer comprising 63 percent by weight of units derived from ethylene. The matrix phase is a homopolymer polypropylene. The formulation further comprised Irganox 1010, Irgafos 168, and an acid scavenger.

Comparative Example 2 is an impact copolymer having an MFR of 2.0 g/10 min, and a dispersed phase comprising 13% by weight of the impact copolymer. The dispersed phase comprises a propylene-ethylene copolymer comprising 63 percent by weight of units derived from ethylene. The matrix phase is a homopolymer polypropylene. The formulation further comprised Irganox 1010, Irgafos 168, and an acid scavenger.

Example 3 is the impact copolymer of Comparative Example 2 further comprising 400 ppm of the fluoropolymer processing aid Dynamar FX5911.

The corrugated boards are prepared using a 160 mm extruder having a die width of approximately 120 inches at a temperature between 220° C. and 230° C. The resulting corrugated boards have a thickness of 4 mm (0.25 mm wall thickness) and a board width after annealing of 109 inches.

Each of the Examples is run first at a line speed of 4.3 m/min and then at a line speed of 5.3 m/min Comparative Examples 1 and 2 each produces corrugated board having no pitting at line speeds of 4.3 m/min, but the boards produced at line speeds of 5.3 exhibit pitting. Example 3, however, exhibits no pitting even when running at a line speed of 7 m/min (the maxim mum line speed for the particular machine).

Although the invention has been described in considerable detail through the preceding description and examples, this detail is for the purpose of illustration and is not to be construed as a limitation on the scope of the invention as it is described in the appended claims. It should be understood that it is expressly contemplated that the following claims may be combined in any order, unless such combination would result in a claimed structure containing incompatible recitations. All United States patents, published patent applications and allowed patent applications identified above are incorporated herein by reference.

What is claimed is:

1. A corrugated board comprising an impact copolymer and a processing aid, wherein the impact copolymer has a melt flow range of from 1.5 to 3.5 g/10 min, and a dispersed phase content of from 5 to 30% by weight, wherein the dispersed phase has an ethylene content of from 30 to 70% by weight of the dispersed phase; and wherein a matrix phase comprises a propylene polymer derived from units of propylene and from 0 to 5% by weight of the dispersed phase of a second comonomer comprising ethylene or 1-butene, and the corrugated board is characterized by having a wall thickness of less than 0.3 mm.

2. The corrugated board of claim 1 wherein the matrix phase comprises a propylene polymer derived from units of propylene and from 0 to 2% by weight of the dispersed phase of a second comonomer comprising ethylene or 1-butene.

3. The corrugated board of claim 1 wherein the board is characterized by having less than 1 pits/$m^2$ on the surface of the board.

4. A corrugated board comprising an impact copolymer and a processing aid, wherein the impact copolymer has a melt flow range of from 1.5 to 3.5 g/10 min, and a dispersed phase content of from 5 to 30% by weight, wherein the dispersed phase has an ethylene content of from 30 to 70% by weight of the dispersed phase; and wherein a matrix phase comprises a propylene polymer derived from units of propylene and from 0 to 5% by weight of the dispersed phase of a second comonomer comprising ethylene or 1-butene, and the corrugated board is characterized by having less than 1 pits/$m^2$ on the surface of the board.

5. The corrugated board of claim 4 wherein the matrix phase comprises a propylene polymer derived from units of propylene and from 0 to 2% by weight of the dispersed phase of a second comonomer comprising ethylene or 1-butene.

6. The corrugated board of claim 5 wherein the board is characterized by having a wall thickness of less than 0.3 mm.

\* \* \* \* \*